(12) United States Patent
D'Antonio

(10) Patent No.: US 8,065,941 B2
(45) Date of Patent: Nov. 29, 2011

(54) TOOL COMPENSATING DEVICE FOR THE COMPUTERIZED NUMERICALLY CONTROLLED MACHINE TOOL

(75) Inventor: Mario D'Antonio, Shanghai (CN)

(73) Assignee: Marposs Societa' Per Azioni, Bentivoglio (BO) (IT)

(*) Notice: Subject to any disclaimer, the term of this patent is extended or adjusted under 35 U.S.C. 154(b) by 1318 days.

(21) Appl. No.: 10/536,391

(22) PCT Filed: Nov. 29, 2003

(86) PCT No.: PCT/KR03/02612
§ 371 (c)(1),
(2), (4) Date: May 26, 2005

(87) PCT Pub. No.: WO2004/050299
PCT Pub. Date: Jun. 17, 2004

(65) Prior Publication Data
US 2006/0037443 A1 Feb. 23, 2006

(30) Foreign Application Priority Data
Nov. 29, 2002 (KR) .................. 10-2002-0075099

(51) Int. Cl.
*B23Q 15/22* (2006.01)
*B23Q 17/22* (2006.01)
(52) U.S. Cl. ............... 82/152; 408/13; 82/118
(58) Field of Classification Search ........... 82/132–139, 82/152–156; 408/9, 10, 13; 409/220, 194
See application file for complete search history.

(56) References Cited

U.S. PATENT DOCUMENTS

| 3,492,894 | A | | 2/1970 | Hahn et al. |
| 3,590,673 | A | | 7/1971 | Foll et al. |
| 3,740,160 | A | * | 6/1973 | Kimura et al. ............ 408/2 |
| 3,749,508 | A | * | 7/1973 | Schukrafft ............... 408/156 |
| 4,055,386 | A | * | 10/1977 | Chynoweth et al. ........ 408/13 |
| 4,204,782 | A | * | 5/1980 | Spits et al. ................ 408/3 |
| 4,335,498 | A | | 6/1982 | Hague et al. |
| 4,425,061 | A | * | 1/1984 | Kindl et al. .............. 408/16 |
| 4,552,493 | A | * | 11/1985 | Schultshick ............... 408/3 |
| 4,662,120 | A | | 5/1987 | Imai et al. |
| 4,784,541 | A | | 11/1988 | Umehara et al. |
| 4,902,175 | A | | 2/1990 | Faulstich et al. |
| 5,066,176 | A | * | 11/1991 | Johnstone .............. 409/133 |
| 5,127,778 | A | | 7/1992 | Scheer |
| 5,609,077 | A | * | 3/1997 | Ohmi et al. ............ 81/57.13 |
| 5,795,114 | A | | 8/1998 | Schweizer et al. |

(Continued)

FOREIGN PATENT DOCUMENTS

DE 297 22 951 U1 4/1996

(Continued)

*Primary Examiner* — Boyer D Ashley
*Assistant Examiner* — Sara Addisu
(74) *Attorney, Agent, or Firm* — Dickstein Shapiro LLP

(57) ABSTRACT

An apparatus for sensing a position of a cutting tool in a computer numerical controlled machine tool is provided including an arm supporting and moving a sensor that cooperates with the cutting tool. Also provided is a housing including a gear assembly and a driving motor for moving the arm, and a stopper for defining an operating position of the arm. The driving motor supplies rotation force to the gear assembly so as to pivot the arm against the stopper and then apply force to an elastic member. When the driving motor is stopped, the elastic member applies a force, through the gear assembly, urging the arm against the stopper in the operating position.

21 Claims, 5 Drawing Sheets

U.S. PATENT DOCUMENTS

| | | | |
|---|---|---|---|
| 6,060,855 A * | 5/2000 | Matsuhashi | 318/652 |
| 6,090,026 A | 7/2000 | Hosokawa et al. | |
| 6,481,939 B1 * | 11/2002 | Gillespie et al. | 409/131 |
| 6,615,697 B2 | 9/2003 | Nakagawa | |
| 2006/0037443 A1 | 2/2006 | D'Antonio | |
| 2007/0221020 A1 * | 9/2007 | D'Antonio | 82/118 |

FOREIGN PATENT DOCUMENTS

| | | |
|---|---|---|
| FR | 2 600 002 A1 | 12/1987 |
| JP | 64-55359 | 4/1989 |
| JP | 1-150826 | 6/1989 |
| JP | 05-162002 | 6/1993 |
| JP | 07-124849 | 5/1995 |
| JP | 10-309652 | 11/1998 |
| JP | 11-188572 | 7/1999 |
| JP | 4202322 | 10/2008 |
| KR | 2004043012 | 11/2002 |
| KR | 2005023157 A | 3/2005 |
| KR | 761196 B1 | 9/2007 |
| KR | 790775 B1 | 1/2008 |

* cited by examiner

PRIOR ART

TOOL COMPENSATING DEVICE FOR THE COMPUTERIZED NUMERICALLY CONTROLLED MACHINE TOOL

TECHNICAL FIELD

The present invention relates to a computerized numerically controlled machine tool, more particularly to an apparatus for sensing a position of a cutting tool so as to compensate a positional deviation from the standard position of the cutting tool in a computer numerical controlled machine tool.

BACKGROUND ART

Generally, the computer numerical controlled machine tool automatically processes a work piece by using a computer after confirming the position of a cutting tool on a basis of a pre-programmed process condition such as a target processing measurement, a desired shape, a transferring speed of the cutting tool, etc.

FIG. 1 shows the conventional computer numerical controlled lathe 10. Referring to FIG. 1, the computer numerical controlled lathe 10 comprises a frame 12 including a bed 12a, a headstock 14 for grasping and fixing one end of the work piece, which is fixed at one side of the frame 12, a tailstock 16 for grasping and fixing the other end of the work piece, which is sliderably positioned on the bed 12a in opposite to the headstock 14, a tool rest 18 for processing the work piece rotated between the headstock 14 and the tailstock 16 while moving along the longitudinal axis of the bed 12a on she side portion of the bed 12a of the frame 12, a control part (not shown) for controlling the headstock 14, the tailstock 16 and the tool rest 18.

The work piece, which is supported and rotated between the headstock 14 and the tailstock 16, is automatically processed by the cutting tool mounted to the tool rest 18 sliding on the bed 12a on a basis of the pre-programmed process condition.

However, problems with the conventional computer numerical controlled machine tool as described above are that a cutting edge of the cutting tool for processing the work piece may be worn due to the friction between the cutting edge and the work piece and the processing precision of the cutting tool may deteriorate due to the change of the cutting tool's position.

A variety of endeavors for solving these problems have been proposed. One approach, a program for compensating the cutting tool's position so as to compensate a positional deviation between the coordinates of the cutting tool for processing the work piece and the standard coordinates in order to enhance the processing capability of the cutting tool during operation of processing the work piece, has been proposed. This program is preliminarily input to the computer numerical controlled lathe 10.

Additionally, an apparatus for sensing a position of the cutting tool during operation of the processing the work piece for a limited time is installed at the computer numerical controlled lathe 10.

FIG. 2 shows the apparatus for sensing a position of the cutting tool mounted to the computer numerical controlled machine tool, more particularly shows the state that it is mounted to the headstock of the computer numerical controlled machine tool.

As shown in FIG. 2, the apparatus 20 for sensing a position of the cutting tool comprises an arm 22 having a sensor 22a for sensing the position of the cutting tool, a gear assembly 24 for pivoting the arm 22 toward the cutting tool, and a driving motor (not shown) for driving the gear assembly 24.

At the apparatus 20 for sensing a position of the cutting tool, the arm 22 having the sensor 22a is moved toward the cutting tool by means of the gear assembly 24 and then the sensor 22a senses a position of the front end of the cutting tool. Thereafter, the sensor 22a provides the control part of the computer numerical controlled machine tool with a detected value.

The control part of the computer numerical controlled machine tool compares the detected value input from the apparatus 20 for sensing a position of the cutting tool with a standard value, and then calculates a displacement of the cutting tool and it sends a control signal for compensating the position of the cutting tool to the computer numerical controlled machine tool in accordance with the result.

Accordingly, it is possible to compensating the position of the cutting tool to its initial state preliminarily set into the computer.

However, one problem with the apparatus for sensing a position of the cutting tool as described above is that the arm having the sensor must be maintained at a sensing position until the sensor senses the position of the cutting tool. Therefore, the driving motor must be continuously operated and thereby it may be damaged due to the overload applied thereto.

DISCLOSURE OF INVENTION

Therefore, the present invention has been developed to solve the above-mentioned problems. It is an object of the present invention to provide an apparatus for sensing a position of a cutting tool which is capable of preventing the overload from being applied the driving motor by stopping the driving motor from operating while a sensor sense the position of the cutting tool in a computer numerical controlled machine tool.

In order to accomplish the above object, the present invention provides a tool compensating apparatus for the computer numerical controlled machine tool, the apparatus comprising:
- a first sensor for sensing a position of a cutting tool in the computer numerical controlled machine tool;
- an arm for moving the first sensor to a predetermined position for sensing the position of the cutting tool;
- a gear assembly for pivoting the aim in a range of predetermined angles, the gear assembly being combined to the aim;
- a driving motor for supplying the gear assembly with a driving force; and
- a housing for enclosing the gear assembly, a stopper and the driving motor.

The gear assembly includes ail idle gear that is engaged with a spur gear mounted to the driving motor, a worm wheel for pivoting the arm by engaging with the arm, a worm for rotating the worm wheel, and a worm shaft having the spur gear at its one end. The worm is sliderably mounted to the worm shaft.

The worm shaft includes a staged portion that is formed at a position spaced a distance from the one end of the worm shaft toward the other end thereof. A flange is formed at the other end of the worm shaft.

The worm is sliderably mounted between the stage-shaped portion and the flange of the worm shaft. An elastic member for elastically supporting the worm is disposed between the worm and the flange of the worm shaft so as to restrain the slide movement of the worm.

A cam pivoting with the worm wheel and a second sensor and a third sensor are disposed in the housing. The second and the third sensors are positioned in close proximity to the worm wheel and they are spaced with each other at a predetermined distance. The second and the third sensors sense the movement of the cam so as to detect the pivoting angles of the worm wheel.

The tool compensating apparatus for the computer numerical controlled machine tool according to the present invention further comprises a stopper for restrain the rotation of the worm wheel in order to limit a pivoting angle of the arm in cooperation with the gear assembly.

The second and the third sensors sense the movement of the cam and then supply a signal for stopping the operation of the driving motor to the control part of the computer numerical controlled machine tool when the cam passes through a standard position.

In the apparatus for sensing the position of the cutting tool according to the preferred embodiment of the present invention as described above, when a rotational force of the driving motor is transmitted to the arm via the worm of the gear assembly and the worm wheel, the arm pivots in a range of predetermined angles.

At this time, if the arm excessively pivots in accordance with the rotation of the worm wheel, the second sensor judges whether the cam adjacent to the worm wheel passes by the second sensor or not. When the cam passes by the second sensor, the second sensor supplies a signal for stopping the operation of the driving motor to the control part of the computer numerical controlled machine tool.

Meanwhile, when the arm excessively pivots, the worm wheel tends to continuously rotate due to its inertial force. Accordingly, the worm engaged with the worm wheel moves toward the other end of the worm shaft along the worm shaft and it may alleviate the rotation of the worm wheel. Since the worm moves back to its initial position by means of the elastic member for elastically supporting the worm, the worm wheel may rotate in the reverse direction and thereby the cam moves a position to be sensed by the second sensor.

As a result, it is possible to prevent the arm from deviating from the position in which the sensor senses the position of the cutting tool. Consequently, the arm can stop a predetermined position in which the sensor precisely senses the position of the cutting tool.

Accordingly, although the driving motor stops operating, the aim can be precisely located at a sensing position in which a sensor can precisely sense the position of the cutting tool.

Since the second and the third sensors sense the pivoting movement of the aim and control the operation of the driving motor, it is possible to hold the continuous operation of the driving motor and therefore to prevent the driving motor from being damaged due to the overload.

BRIEF DESCRIPTION OF DRAWINGS

The above objects and other characteristics and advantages of the present invention will become more apparent by describing in detail a preferred embodiment thereof with reference to the attached drawings, in which.

BEST MODE FOR CARRYING OUT THE INVENTION

Embodiments

Hereinafter, the apparatus for sensing the position of the cutting tool in the computer numerical controlled machine tool according to the preferred embodiment of the present invention will be described in detail with reference to the accompanying drawings.

Figure 1:
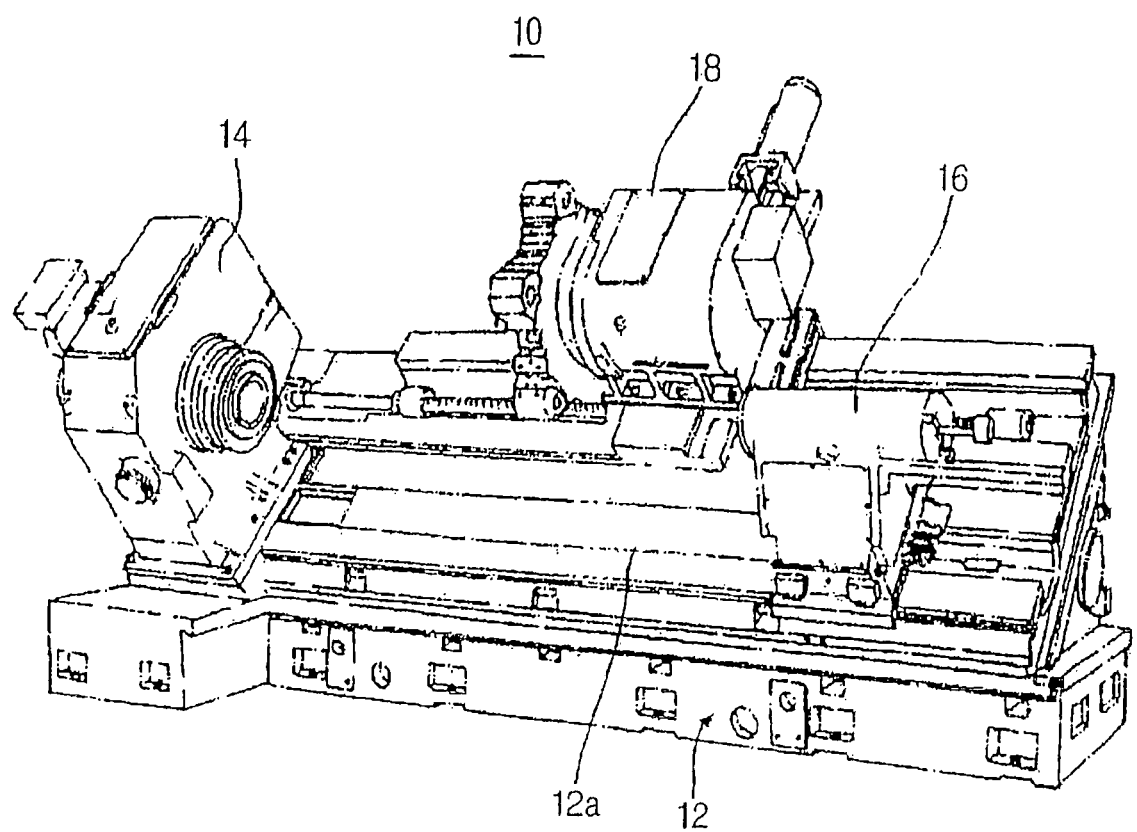
FIG. 1 is a perspective view of a conventional computer numerical controlled machine tool.
Figure 2:
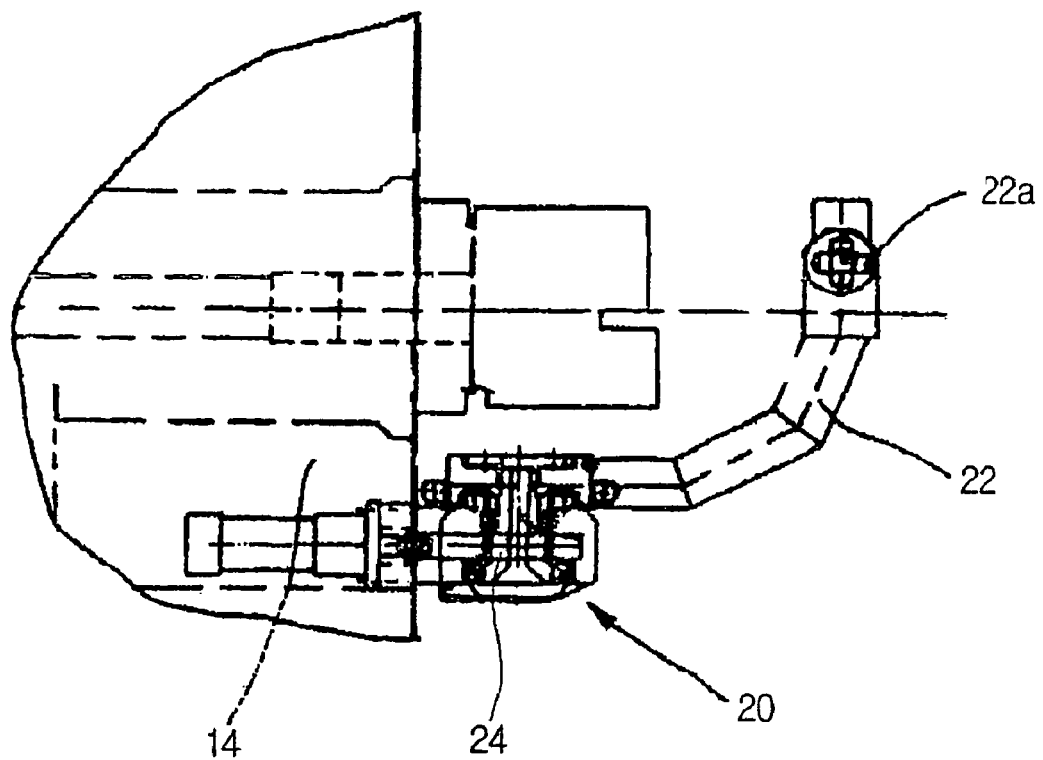
FIG. 2 shows an apparatus for sensing a position of a cutting tool mounted to the computer numerical controlled machine tool, more particularly shows the state that it is mounted to a headstock of the computer numerical controlled machine tool.
Figure 3:
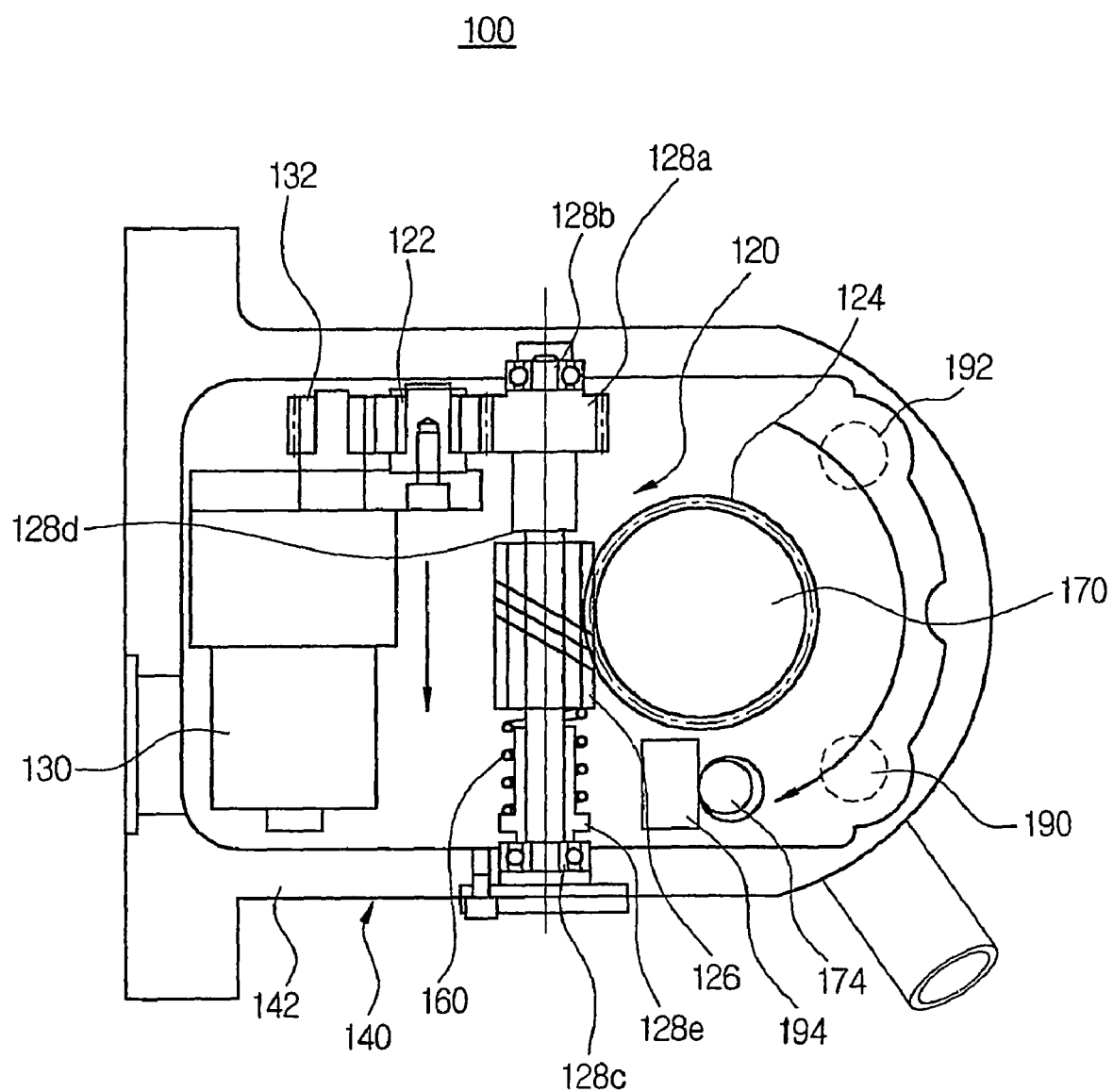
FIG. 3 is a cross sectional view of the apparatus for sensing the position of the cutting tool according to a preferred embodiment of the present invention, showing a state that a worm has been moved along a worm shaft at a predetermined distance due to the inertial force of a worm wheel while the driving motor stops operating.
Figure 4:
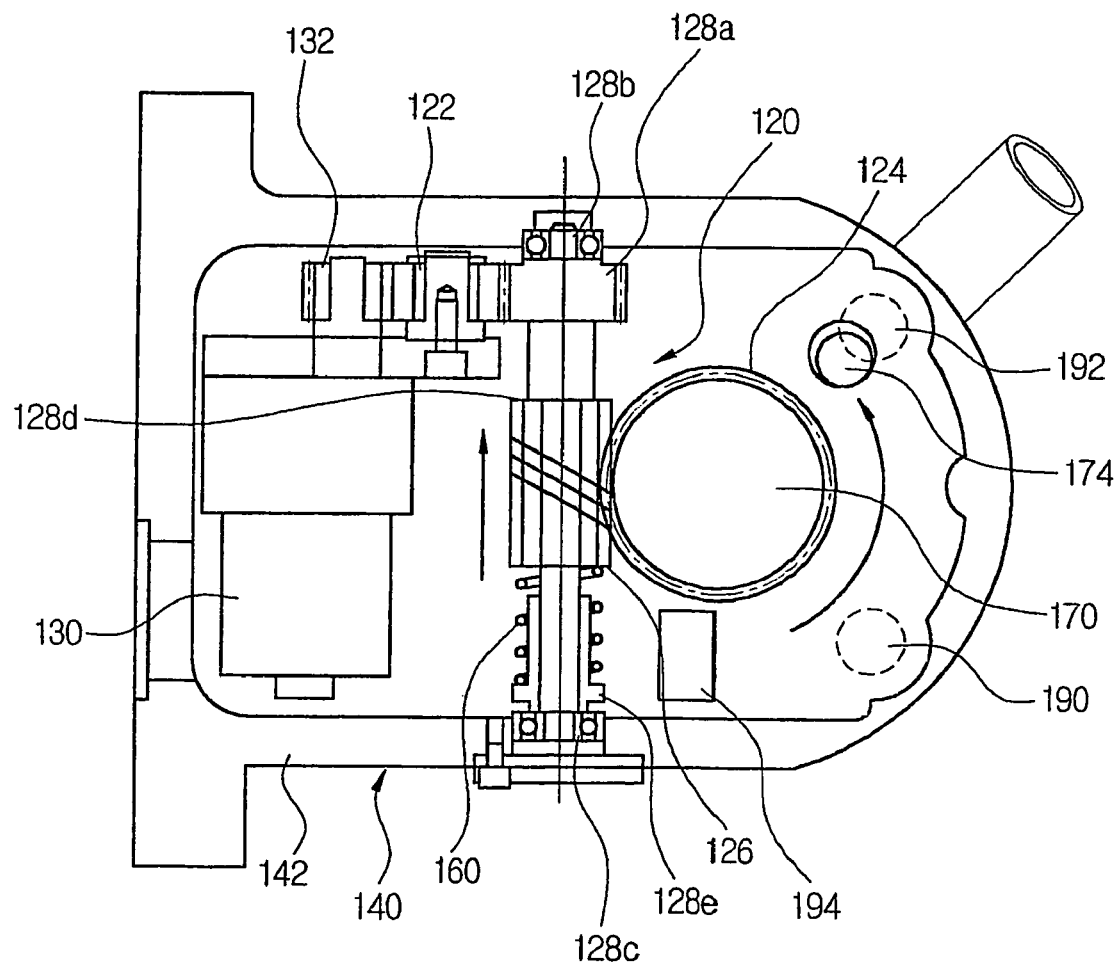
FIG. 4 is a cross sectional view of the apparatus for sensing the position of the cutting tool according to the preferred embodiment of the present invention, showing a state that the worm has been returned to its initial position due to operation of an elastic member.
Figure 5:
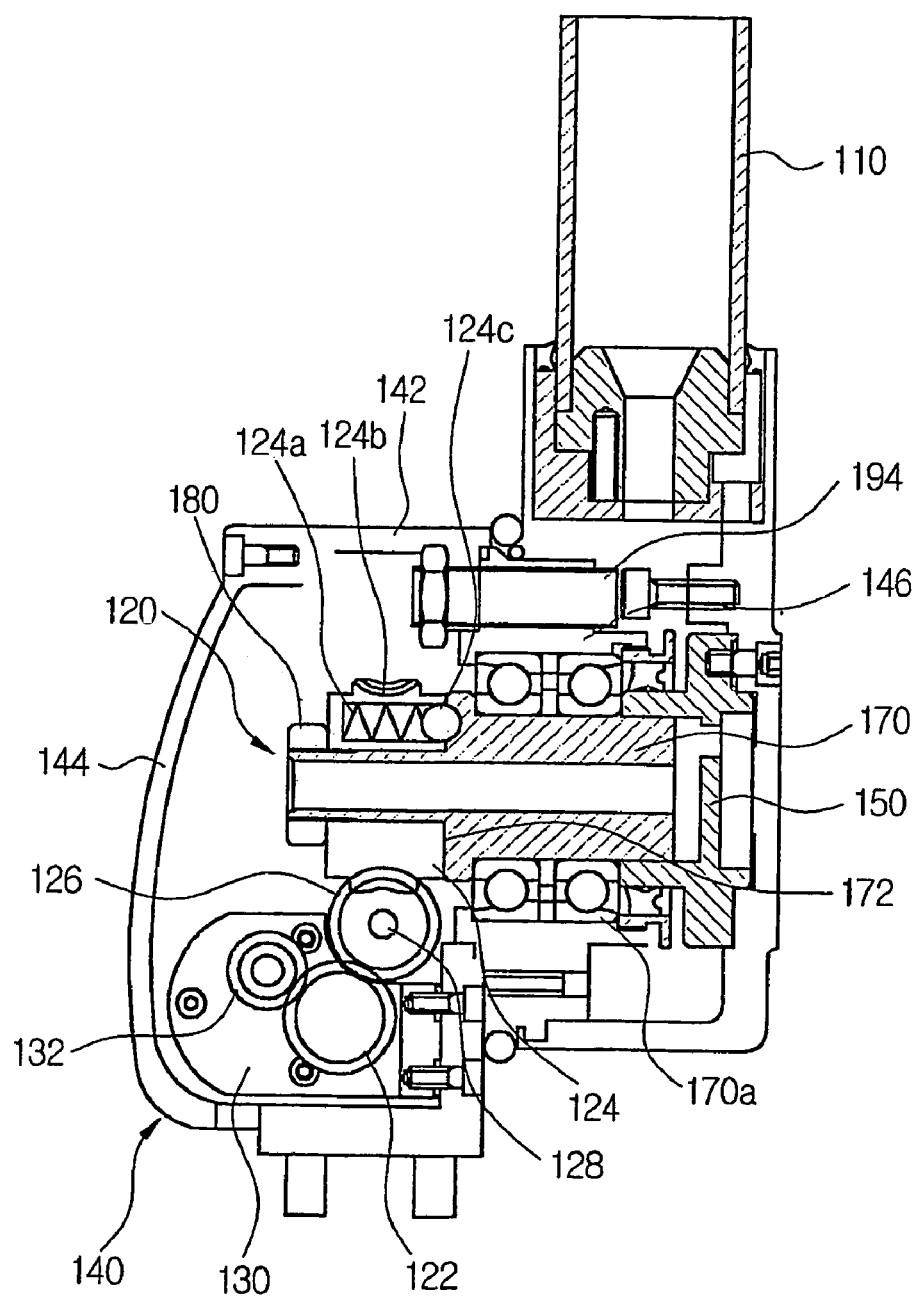
FIG. 5 is a longitudinal sectional view of the apparatus for sensing the position of the cutting tool according to the preferred embodiment of the present invention, showing a state that the apparatus for sensing the position of the cutting tool as shown in FIGS. 3 and 4 is rotated at 90 degrees against the axis of the worm shaft.

Since a first sensor of the apparatus 100 for sensing the position of the cutting tool according to the preferred embodiment of the present invention is the same as that of the conventional apparatus 20 for sensing the position of the cutting tool as shown in FIG. 2, it is represented as the same numeral as that of the conventional apparatus. FIG. 3 is a cross sectional view of the apparatus 100 for sensing the position of the cutting tool according to a preferred embodiment of the present invention, showing a state that a worm has been moved along a worm shaft at a predetermined distance due to the inertial force of a worm wheel while the driving motor 130 stops operating. FIG. 4 is a cross sectional view of the apparatus 100 for sensing the position of the cutting tool according to the preferred embodiment of the present invention, showing a state that the worm has been returned to its initial position due to operation of an elastic member. FIG. 5 is a longitudinal sectional view of the apparatus 100 for sensing the position of the cutting tool according to the preferred embodiment of the present invention, showing a state that the apparatus 100 for sensing the position of the cutting tool as shown in FIGS. 3 and 4 is rotated at 90 degrees against the axis of the worm shaft.

As shown in FIGS. 3 to 5, the cutting tool 100 according to the preferred embodiment of the present invention comprises a first sensor 22a for sensing the position of the cutting tool mounted to the tool rest in the computer numerical controlled machine tool; an arm 110 for moving the first sensor 22a to a position for sensing the position of the cutting tool; a gear assembly 120 for pivoting the aim 110 in a range of predetermined angles, the gear assembly 120 being combined to the aim 110; a driving motor 130 for supplying a driving force to the gear assembly 120 so as to rotate the arm 110; and a housing 140 for accommodating the gear assembly 120 and the driving motor 130.

The housing 140 includes a main body 142 having an oval-shaped section, a cover 144 combined to the main body 142 at one side of the main body 142, and a supporting member 146 for supporting a shaft of one gear among the gears of the gear assembly 120, the supporting member 146 being combined to the main body 142 at the other side of the main body 142.

The cover 144 and the supporting member 146 are combined to both sides of the main body 142 by means of a screw, respectively.

Preferably, the driving motor 130 comprises a servomotor. A spur gear 132 is mounted to a distal end of the rotational shaft of the driving motor 130.

The arm 110 is fixed to a connecting member 150 by means of a screw where the connecting member is forcibly fitted into the other end of the shaft of the worm wheel, will be explained herein below. Accordingly, the arm 110 can rotate in the rotational direction of the shaft of the worm wheel.

The arm 110 is provided with the first sensor 22a for sensing the position of the cutting tool at its distal end. The first sensor 22a mounted to the distal end of the arm 110 senses the position of the cutting tool when the arm 110 rotates and then reaches a set position in which the arm 110 faces to the cutting tool. Thereafter, the first sensor 22a provides the control part of the computer numerical controlled machine tool with a detected data. The arm 110 may pivot toward workspace in the computer numerical controlled machine tool due to the operation of the driving motor 130 and then reaches a sensing position at which the first sensor 22a senses the position of the cutting tool mounted to the tool rest 18. Alternatively, the arm may get away from workspace and then reaches an initial position at which the first sensor 22a stands ready for sensing the position of the cutting tool.

The gear assembly 120 includes an idle gear 122 that is engaged with a spur gear 132 mounted to the driving motor 130; a worm wheel 124 for pivoting the am 110 by engaging with the arm 110; a worm 126 for rotating the worm wheel 124; and a worm shaft 128 having a spur gear 128a at its one end. At this time, the worm 126 is sliderably mounted to the worm shaft 128.

The idle gear 122 for reducing the rotational force of the driving motor 130 is disposed between the spur gear 128a mounted to the worm shaft 128 of the gear assembly 120 and the spur gear 132 mounted to the distal end of the rotational shaft of the driving motor 130.

Both ends of the worm shaft 128 are supported by bearings 128b, 128c on the inner surface of the housing 140. The spur gear 128a is mounted to the one end of the worm shaft 128 and is engaged with the idle gear 122 for receiving a rotational force from the driving motor 130 via the idle gear 122.

A staged portion 128d is formed at a position spaced a distance from the one end of the worm shaft 128 toward the other end thereof along the axis of the worm shaft 128. A flange 128e is formed at the other end of the worm shaft 128.

At the worm shaft 128, an elongated key groove (not shown) having predetermined width and depth is longitudinally formed at an outer periphery surface between the stage-shaped portion 128d and the flange 128e.

The worm 126 is mounted onto the worm shaft 128 at the other end of the worm shaft 128 and it can reciprocally slide between the stage-shaped portion 128d and the flange 128e of the worm shaft 128.

A key (not shown) for preventing the worm 126 from independently rotating with respect to the worm shaft 128 is inserted into the key groove formed at the worm shaft 128. When the worm 126 slides along the worm shaft 128, the key slides along the worm shaft 128 together with the worm 126.

An elastic member 160 for elastically restraining the slide movement of the worm 126 along the worm shaft 128 is disposed between the worm 126 mounted to the worm shaft 128 and the flange 128e of the worm shaft 128. Preferably, the elastic member 160 comprises a coiled spring.

The worm wheel 124 is mounted to one end of a worm wheel shaft 170 mounted to the supporting member 146 that is combined to the other side of the main body 142 of the housing 140. A recess 124a having a predetermined diameter is formed at a predetermined position on the one side surface of the worm wheel 124.

An additional elastic member 124b having a predetermined elastic force is inserted into the recess 124a. A ball 124c is disposed at the open portion of the recess 124a so that it is elastically supported by the additional elastic member 124b.

A stepped portion 172 is formed at a middle portion of the worm wheel shaft 170. Furthermore, a screw is formed at one end of the worm wheel shaft 170. By engaging a nut 180 with one end of the worm wheel shaft 170 after mounting the worm wheel 124 to the one end, it is possible to prevent the worm wheel 124 from independently rotating with respect to the worm wheel shaft 170.

The other end of the worm wheel shaft 170 is rotatably engaged with the supporting member 146 of the housing 140 by means of a bearing 170a The connecting member 150 for mounting the arm 110 is forcibly fitted into the other end of the worm wheel shaft 170 as shown in FIG. 5.

One end of the arm 110 is engaged with the connecting member 150 forcibly fitted into the other end of the worm wheel shaft 170 and it rotates together with the worm wheel shaft 170.

A cam 174 pivoting with the worm wheel 124 and a second sensor 190 and a third sensor 192 are disposed in the housing 140. The second and the third sensors 190,192 are positioned in close proximity to the worm wheel 124 and they are spaced with each other at a predetermined distance. The second and the third sensors 190,192 sense the movement of the cam 174 so as to detect the pivoting angles of the worm wheel 124.

The second and the third sensors 190,192 are disposed at the housing 140 so that they are spaced around the worm wheel 124 with each other at a predetermined radial distance corresponding to the pivoting angle of the arm 110 round the axis of the worm wheel shaft 170.

When the cam 174 passes through the second sensor 190 during the movement of the cam 174 together with the worm wheel shaft 170 due to the rotation of the worm wheel shaft 170, the second sensor 190 senses the movement of the cam 174 and then supplies a sensing signal to the control part of the computer numerical controlled machine tool.

After receiving the sensing signal from the second sensor 190, the control part of the computer numerical controlled machine tool makes the driving motor 130 to stop so that it suppresses the rotation of the worm wheel 124 and the arm 110 mounted to the worm wheel shaft 170 and rotating together with the worm wheel 124.

When the first sensor 22a installed at the arm 110 senses the position of the cutting tool and the position of the cutting tool is compensated and thereafter the worm wheel 124 returns to its initial position via the worm 126 by rotating itself in the reverse direction, the third sensor 192 senses the movement of the cam 174 and then it sends a sensing signal to the control part of the computer numerical controlled machine tool.

A stopper 194 is mounted to the other side of the housing 140 and it is spaced from the second sensor 190 at a predetermined distance. The stopper 194 makes the worm wheel 124 to stop in order to limit a pivoting angle of the arm 110 in cooperation with the worm 126 of the gear assembly 120 and the elastic spring 160.

Hereinafter, the operation and the effect of the computer numerical controlled machine tool according to the preferred embodiment of the present invention will be briefly explained.

In the apparatus 100 for detecting the position of the cutting tool in the computer numerical controlled machine tool as described above, the arm 110 stops at its initial position while the tool rest moves in order to process a worm piece. As is most clearly seen in FIG. 4, the cam 174 rotating together with the worm wheel 124 is coaxial with the axis of the third sensor 192.

The arm 110 maintained its initial position is far away from the tool rest and the headstock such that it does not hinder cutting tool's operating during reciprocal movement of the cutting tool along the bed of the computer numerical controlled machine tool.

In order to process the work piece by using the computer numerical controlled machine tool, at first, one end of the work piece is fixed to the turret of the headstock and then the other end of the work piece is fixed to the tailstock after moving the tailstock so as to support the other end of the work piece. Consequently, the work piece is fixed in the computer numerical controlled machine tool.

Thereafter, the control part judges whether the cutting tool is correctly mounted to the tool rest at its initial position or not.

In order to detect the position of the cutting tool, the driving motor 130 operates and rotates. Thereby, the rotational force is transmitted to the worm 126 via the spur gear 132 mounted to the rotational axis of the driving motor 130 and the idle gear 122 engaged with the spur gear 132.

Continuously, the rotational force of the driving motor 130 is transmitted to the worm wheel 124 via the worm 126 and thereby the worm wheel shaft 170 for supporting the worm wheel 124, of which the arm 110 is mounted to the other end thereof by means of the connecting member 150, begins to be rotated.

Accordingly, the arm 110 combined to the worm wheel shaft 170 is pivoted toward the cutting tool of the computer numerical controlled machine tool.

At this time, the worm 126 and the worm wheel 124 rotate together due to the rotational force of the driving motor 130. The worm wheel 124 continuously rotates until the arm 110 reaches the stopper 194. When the arm 110 reaches the stopper 194, the first sensor 22a installed at the front end of the arm 110 stops at the sensing position in order to sense the front end of the tool rest.

If the arm 110 reaches the stopper 194, the worm wheel 124 cannot be rotated. Under this state, if the driving motor 130 is operated for about a half second, the worm wheel shaft 170 may continuously rotate in the clockwise direction. At this time, the worm 126 engaged with the worm wheel 124 also rotates and then moves along the arrow direction (referred to FIG. 3). As a result, the other end of the worm 126 is spaced from the staged portion 128d of the worm shaft 128 at a predetermined distance and thereby the elastic spring 160 is compressed.

If the driving motor 130 stops operating, the elastic force of the elastic spring 160 is applied to the worm 126 along the arrow direction (refer to FIG. 4). At this time, a rotational force is applied by the worm 126 to the worm wheel 124 in the clockwise direction. Although the driving motor 130 is not operating, the arm 110 is brought into contact with the stopper 194 and thereby the first sensor 22a is fixed at the sensing position.

Under this state, if the first sensor 22a senses the position of the front end of the tool rest and then the position thereof is compensated, the driving motor 130 operates in the reverse rotational direction so as to return the arm 110 to its initial position.

If the driving motor 130 is operated in the reverse rotational direction, the worm shaft 128 rotates in the counter-clockwise direction. Accordingly, the worm 126 also rotates in the counter-clockwise direction and continuously moves along the arrow direction by receiving the rotational force of the worm shaft 128 and the elastic force of the elastic spring 160 (referred to FIG. 4). Until the first sensor 22a of the arm 110 is positioned at the initial position, the worm wheel 170 engaged with the worm 126 rotates in the counter-clockwise direction.

Herein below, the operation and the effect of the computer numerical controlled machine tool according to the preferred embodiment of the present invention will be explained in detail.

If the cam 174 passes through the second sensor 190, the second sensor 190 senses the movement of the cam 174 and transmits a sensing signal to the control part of the computer numerical controlled machine tool.

The control part of the computer numerical controlled machine tool makes the driving motor 130 to stop as soon as receive the signal of sensing the movement of the cam 174 from the second sensor 190.

Because the arm 110 continuously pivots due to the inertia force, the worm wheel shaft 170 combined to the aim 110 rotates together with the arm 110.

Accordingly, the worm wheel 124 mounted to the worm wheel shaft 170 rotates together with the worm wheel shaft 170. As the result of the rotation of the worm wheel 124, the worm 126 engaged therewith receives the rotational force.

At this time, because the worm 126 is engaged with the spur gear 132 mounted to the rotational shaft of the driving motor 130 via the idle gear 122, it is possible to restrain the rotation of the worm 126. Accordingly, the worm 126 slides toward the other end of the worm shaft 128, that is, toward the flange 128e, along the worm shaft 128 at the arrow as shown in FIG. 3 in order to alleviate or release the rotational force transmitted from the worm wheel 124.

As a result, the worm wheel 124 and the worm wheel shaft 170 stop rotating due to the alleviation of the rotational force of the worm wheel 124 and the worm wheel shaft 170.

In the meantime, while the worm 126 alleviates the rotational force of the worm wheel 124, the cam 174 rotating together with the worm wheel 124 is contacted with the stopper 194. At this time, the stopper 194 makes the cam 174 to stop and also the worm wheel 124 stops rotating.

Thereafter, the worm 126 moves back to its initial position due to operation of the elastic spring 160 disposed between the worm 126 of the worm shaft 128 and the flange 128e. Accordingly, the worm wheel 124 engaging with the worm 126 is rotated in the reverse direction.

As a result, the cam 174 rotating together with the worm wheel 124 and the aim 110 mounted to the worm wheel shaft 170 for supporting the worm 124 are also rotated in the reverse direction.

Finally, if the worm 126 moves back to its initial position, the cam 174 is located on the axis of the second sensor 190 and the first sensor 22a installed to the arm 110 faces to the cutting tool mounted to the computer numerical controlled machine tool.

As described above, when the first sensor 22a mounted to the aim 110 faces to the cutting tool, it senses the mounting position of the cutting tool and sends a sensing signal to the control part of the computer numerical controlled machine tool.

The control part compares the sensing signal of the first sensor 22a with a programmed positional data of the cutting tool and then compensates the position of the cutting tool if the position of the cutting tool is incorrect.

Alternatively, if the position of the cutting tool is correct, the control part makes the arm 110 of the apparatus 100 for sensing the position of the cutting tool to return its initial position and transfers the tool rest to the working position.

Meanwhile, after compensating the position of the cutting tool, the arm 110 returns to its initial position.

In order to return the aim 110 to its initial position, the rotational shaft of the driving motor 130 rotates in the reverse direction. Accordingly, the idle gear 122 engaged with the spur gear 132 mounted to the rotational shaft of the driving motor 130 also rotates in the reverse direction and thereby the rotational force is transmitted to the worm shaft 128.

The worm 126 mounted to the worm shaft 128 is also rotated in the reverse direction and thereby the worm wheel 124 rotates in the reverse direction.

Accordingly, the cam 174 rotating together with the worm wheel 124 the arm 110 combined to the other end of the worm wheel shaft 170 for supporting the worm wheel 124 rotate together with the worm wheel 124 in the reverse direction and then they return to their initial position.

When the cam 174 rotating together with the worm wheel 124 passes through the third sensor 192, the third sensor 192 senses the movement of the cam 174 and thereby it sends a sensing signal to the control part of the computer numerical controlled machine tool.

After receiving the sensing signal from the third sensor 192, the control part makes the driving motor 130 to stop.

In this case, the arm 110 continuously rotates in the reverse direction due to the inertia force and the worm wheel shaft 170 supporting the arm 110 and the worm wheel mounted to the worm wheel shaft 170 also continuously rotate in the reverse direction.

Since the worm 126 engaged with the worm wheel 124 is supported by the staged portion 128d of the worm shaft 128 under the state that it stops rotating, the rotation of the worm wheel 124 in the reverse direction is forcibly prevented.

Accordingly, the worm wheel shaft 170 supporting the worm wheel 124 and the arm 110 engaged with thereof stop reverse rotating. At this time, the arm 110 is positioned to its initial position, that is, on the axis of the third sensor 192.

In the mean time, if the work piece is processed for a predetermined time, the cutting tool may be worn due to the friction against the work piece. Furthermore, the position of the cutting tool may be deviated from an initial set position due to the characteristic of the work piece and the processing time interval.

In thus case, after stopping the process for processing the work piece and moving the cutting tool to its initial position on the bed, the apparatus 100 senses the position of the cutting tool and then the positional error is compensated in accordance with the detected result.

Under this case, individual elements of the apparatus for sensing the position of the cutting tool begins to be operated in the sequence as described above.

INDUSTRIAL APPLICABILITY

As described above, in the apparatus for sensing the position of the cutting tool according to the preferred embodiment of the present invention, although the driving motor stops operating, the arm can be precisely located at the sensing position in which a first sensor can precisely sense the position of the cutting tool.

Since the second and the third sensors sense the pivoting movement of the arm and control the operation of the driving motor, it is possible to hold the continuous operating of the driving motor and therefore to prevent the driving motor from being damaged due to the overload.

While the present invention has been particularly shown and described with reference to particular embodiments thereof, it will be understood by those skilled in the art that various changes in form and details may be effected therein without departing from the spirit and scope of the invention as defined by the appended claims.

The invention claimed is:

1. A tool compensating apparatus for a computer numerically controlled machine tool, the apparatus comprising:
   a first sensor for cooperating with a cutting tool and sensing a position of said cutting tool in the computer numerically controlled machine tool;
   an arm for moving the first sensor to a predetermined position for cooperating with the cutting tool;
   a gear assembly for pivoting the arm in a range of predetermined angles, the gear assembly being engaged with the arm and including a worm;
   a driving motor for supplying the gear assembly with a driving force;
   a housing for accommodating the gear assembly, a stopper and the driving motor; and
   an elastic member for elastically engaging the worm so as to apply an elastic force urging the arm toward the stopper.

2. The tool compensating apparatus for the computer numerically controlled machine tool according to claim 1, wherein the gear assembly includes an idle gear that is engaged with a first spur gear mounted to the driving motor, a worm wheel for pivoting the arm by engaging the arm, the worm being adapted for rotating the worm wheel, and a worm shaft having a second spur gear at one end, the worm being slidably mounted to the worm shaft.

3. The tool compensating apparatus for the computer numerically controlled machine tool according to claim 2, wherein a staged portion is disposed at a position spaced from the one end of the worm shaft, and a flange is disposed at the other end of the worm shaft.

4. The tool compensating apparatus for the computer numerically controlled machine tool according to claim 3, wherein the worm is slidably mounted between the staged portion and the flange on the worm shaft, and the elastic member is disposed between the worm and the flange on the worm shaft so as to restrain slide movement of the worm.

5. A tool compensating apparatus for a computer numerically controlled machine tool, the apparatus comprising:
   a first sensor for cooperating with a cutting tool and sensing a position of said cutting tool in the computer numerically controlled machine tool;
   an arm for moving the first sensor to a predetermined position for cooperating with the cutting tool;
   a gear assembly for pivoting the arm in a range of predetermined angles, the gear assembly being engaged with the arm and including an idle gear that is engaged with a first spur gear, a worm wheel for pivoting the arm by engaging the arm, a worm for rotating the worm wheel, and a worm shaft having a second spur gear at one end, the worm being slidably mounted to the worm shaft;
   a driving motor for supplying the gear assembly with a driving force, the first spur gear being mounted to the driving motor; and
   a housing for accommodating the gear assembly, a stopper and the driving motor, wherein a staged portion is disposed at a position spaced from the one end of the worm shaft, and a flange is disposed at the other end of the worm shaft, wherein the worm is slidably mounted between the staged portion and the flange on the worm shaft, and an elastic member for elastically engaging the worm is disposed between the worm and the flange on the worm shaft so as to restrain slide movement of the worm, and wherein a cam pivoting with the worm wheel and a second sensor and a third sensor are disposed in the housing, the second and the third sensors being positioned in close proximity to the worm wheel and spaced from each other a predetermined distance, and wherein the second and the third sensors sense movement of the cam so as to detect pivoting angles of the worm wheel.

6. The tool compensating apparatus for the computer numerically controlled machine tool according to claim 5, wherein said stopper is adapted for restraining rotation of the worm wheel in order to limit a pivoting angle of the arm in cooperation with the gear assembly.

7. The tool compensating apparatus for the computer numerically controlled machine tool according to claim 5, wherein the second and the third sensors sense the movement of the cam and then supply a signal for stopping operation of the driving motor to a control part of the computer numerically controlled machine tool when the cam passes through a standard position.

8. An arm assembly for a tool compensating apparatus for a machine tool, the arm assembly being adapted to support and move a sensor to a predetermined position for sensing a position of a cutting tool, the arm assembly comprising:
an arm;
a gear assembly for pivoting the arm in a range of predetermined angles;
a driving motor for supplying the gear assembly with a driving force; and
a stopper for restraining rotation of the arm and defining the predetermined position of said first sensor,
wherein the gear assembly comprises an elastic member adapted to apply a force urging said arm towards said stopper.

9. The arm assembly according to claim 8, wherein the gear assembly is arranged so that the driving force of the driving motor is applied to the elastic member when the rotation of the arm is restrained by the stopper, the elastic member applying said force urging said arm towards said stopper after operation of the driving motor is stopped.

10. The arm assembly according to claim 9, wherein the gear assembly includes a worm wheel coupled to the arm, the elastic member being adapted to apply said force to the worm wheel.

11. The arm assembly according to claim 10, wherein the gear assembly includes a worm for rotating the worm wheel, and a worm shaft coupled to the driving motor, the worm being slidably mounted to the worm shaft, the driving force supplied by the driving motor urging the worm shaft and the worm to rotate about an axis.

12. The arm assembly according to claim 11, wherein the elastic member applies said force to the worm along said axis.

13. The arm assembly according to claim 12, wherein said elastic member is a coil spring.

14. The arm assembly according to claim 13, wherein said coil spring is a compression spring.

15. The arm assembly according to claim 11, wherein a staged portion is disposed at a predetermined distance from one end of the worm shaft, and a flange is disposed at the other end of the worm shaft.

16. The arm assembly according to claim 15, wherein the worm is slidably mounted between the staged portion and the flange of the worm shaft, said elastic member being disposed between the worm and the flange of the worm shaft.

17. A tool compensating apparatus for a machine tool, the apparatus comprising:
a first sensor for sensing a position of a cutting tool in the machine tool;
an arm for moving the first sensor to a predetermined position for sensing the position of the cutting tool;
a gear assembly with a worm wheel coupled to the arm for pivoting the arm in a range of predetermined angles;
a driving motor for supplying the gear assembly with a driving force; and
a stopper for restraining the rotation of the worm wheel in order to limit a pivoting angle of the arm and define said predetermined position of the first sensor,
wherein the gear assembly includes an elastic member, the driving force of the driving motor being applied to the elastic member when the rotation of the worm wheel is restrained by the stopper, the elastic member being adapted to apply a force urging said arm towards said stopper after the operation of the driving motor is stopped.

18. The apparatus according to claim 17, wherein said elastic assembly is a coil spring disposed about a worm shaft.

19. A tool compensating apparatus for a machine tool, the apparatus comprising:
a first sensor for sensing a position of a cutting tool in the machine tool;
an arm for moving the first sensor to a predetermined position for sensing the position of the cutting tool;
a gear assembly with a worm wheel coupled to the arm for pivoting the arm in a range of predetermined angles;
a driving motor for supplying the gear assembly with a driving force;
a second sensor and a third sensor for sensing movements of said arm; and
a stopper for restraining the rotation of the worm wheel in order to limit a pivoting angle of the arm and define said predetermined position of the first sensor, wherein the gear assembly includes an elastic member, the driving force of the driving motor being applied to the elastic member when the rotation of the worm wheel is restrained by the stopper, the elastic member being adapted to apply a force urging said arm towards said stopper after the operation of the driving motor is stopped.

20. The apparatus according to claim 19, wherein said second and third sensors are spaced from each other by a radial distance corresponding to a range of movement of said arm.

21. A tool compensating apparatus for a computer numerically controlled machine tool, the apparatus comprising:
a first sensor for sensing a position of a cutting tool in the computer numerically controlled machine tool;
an arm for moving the first sensor to a predetermined position for sensing the position of the cutting tool;
a gear assembly for pivoting the arm in a range of predetermined angles, the gear assembly being engaged with the arm;
a driving motor for supplying the gear assembly with a driving force;
a stopper adapted for restraining rotation of the worm wheel in order to limit a pivoting angle of the arm in cooperation with the gear assembly; and a housing for accommodating the gear assembly, the stopper and the driving motor, wherein a cam pivoting with the gear assembly and a second sensor and a third sensor are disposed in the housing, the second and third sensors being spaced from each other a predetermined distance, and wherein the second and third sensors sense movement of the cam so as to detect pivoting angles of the arm.

* * * * *